US012186257B1

(12) United States Patent
Cun et al.

(10) Patent No.: US 12,186,257 B1
(45) Date of Patent: Jan. 7, 2025

(54) MASSAGER

(71) Applicant: Shenzhen Envision Technology Innovation Co., Ltd., Shenzhen (CN)

(72) Inventors: Lang Cun, Shenzhen (CN); Xuefei Cai, Shenzhen (CN); Qing Ma, Shenzhen (CN)

( * ) Notice: Subject to any disclaimer, the term of this patent is extended or adjusted under 35 U.S.C. 154(b) by 0 days.

(21) Appl. No.: 18/661,904

(22) Filed: May 13, 2024

(51) Int. Cl.
*A61H 23/02* (2006.01)
*A61H 19/00* (2006.01)

(52) U.S. Cl.
CPC ......... *A61H 23/0263* (2013.01); *A61H 19/32* (2013.01); *A61H 2201/0107* (2013.01); *A61H 2201/0153* (2013.01); *A61H 2201/1215* (2013.01); *A61H 2201/1695* (2013.01)

(58) Field of Classification Search
CPC ........ A61H 19/00; A61H 19/30; A61H 19/32; A61H 19/40; A61H 19/44; A61H 23/0263; A61H 23/0254; A61H 2201/0107; A61H 2201/0153; A61H 2201/1215; A61H 2201/1695; A61H 1/008; A61H 7/002; A61H 7/003; A61H 7/004; A61H 7/005; A61H 7/007; A61H 21/00; A61H 23/006; A61H 23/02; A61H 23/004; A61H 2023/002
See application file for complete search history.

(56) References Cited

U.S. PATENT DOCUMENTS

| | | | | |
|---|---|---|---|---|
| 9,889,064 B1 * | 2/2018 | Olivares | A61H 19/40 | |
| 2007/0118058 A1 * | 5/2007 | Isshiki | A61H 19/34 | 601/80 |
| 2012/0316390 A1 * | 12/2012 | Topolev | A61H 19/30 | 600/38 |
| 2014/0088470 A1 * | 3/2014 | Topolovac | A61H 19/44 | 601/82 |
| 2014/0171842 A1 * | 6/2014 | Conner | A61H 23/0263 | 601/46 |
| 2023/0352967 A1 * | 11/2023 | Torres | H02J 7/0048 | |
| 2023/0414448 A1 * | 12/2023 | Bain | A61H 19/44 | |

* cited by examiner

*Primary Examiner* — Bradley H Philips
*Assistant Examiner* — Savannah L Gabriel
(74) *Attorney, Agent, or Firm* — Daniel M. Cohn; Howard M. Cohn

(57) ABSTRACT

The present disclosure provides massager, comprising: a base body, a driving mechanism assembled in the base body, and a massage body drivingly connected to the driving mechanism, characterized in that the massage body comprises: a sleeve section is sleeved on the outside of the base body to relatively fix the massage body and the base body; a pressing section is connected to the end of the sleeve section and is drivingly connected to the driving mechanism, and a slap band is formed in the middle part, which is used to perform point-pressure massage on the external massaged area driven by the driving mechanism; the vibration section is used to absorb the power transmitted from the pressing section to massage the external massaged area. The present invention has an integrated design of the massage body, which can be quickly disassembled for deep cleaning of the massage body.

9 Claims, 6 Drawing Sheets

MASSAGER

TECHNICAL FIELD

The present disclosure relates to a technical field of massage devices, and in particular to a massager.

BACKGROUND

A massager usually comprises a base body, a driving mechanism assembled in the base body, and a massage body fixedly connected to the output shaft of the driving mechanism. In actual use, the massage body needs to be attached to the massaged area with vibration and tapping to achieve the effects of relieving muscle soreness and stimulating acupuncture points.

Since massage bodies are mostly used against the skin and/or into the body, in order to ensure personal hygiene, the massage bodies need to be cleaned before and after use. The massage body and driving mechanism of existing massagers cannot be separated, and disinfectant spraying and scrubbing are usually used for cleaning. The massage body cannot be deeply washed, and the cleaning effect cannot be guaranteed. Alternatively, the entire massager may be designed to be waterproof so that the entire machine can be soaked and washed. This would be expensive and not conducive to cost control.

SUMMARY

The present disclosure provides a massager, and solves the problem of being able to quickly disassemble the massage body for deep cleaning.

In order to realize the above purpose, the present disclosure provides a massager, comprising: a base body, a driving mechanism assembled in the base body, and a massage body drivingly connected to the driving mechanism, the massage body comprises: the sleeve section is sleeved on the outside of the base body to relatively fix the massage body and the base body; the pressing section is connected to the end of the sleeve section and is drivingly connected to the driving mechanism, and a slap band is formed in the middle part, which is used to perform point-pressure massage on the external massaged area driven by the driving mechanism; the vibration section is relatively fixed to the end of the pressing section, and is used to absorb the power transmitted from the pressing section to massage the external massaged area.

In one embodiment, the middle part of the pressing section is provided with a hollow hole, the slap band is provided in the hollow hole, and its two ends are respectively fixed on the hole walls of the hollow hole to connect the sleeve section and the vibration section respectively.

In one embodiment, the slap band is provided with an accommodation cavity near one end of the sleeve section; the driving mechanism is drivingly connected with the slap band by inserting the output shaft into the accommodating cavity, and the middle part of the slap band is designed to be bent to form a striking protrusion.

In one embodiment, the slap band is provided with at least two striking protrusions, the striking protrusions are smoothly transitioned into arcs.

In one embodiment, the end opening of the sleeve section is a chamfered elliptical opening surrounding the outer wall of the base body.

In one embodiment, the sleeve section, the pressing section and the vibration section are integrally formed.

In one embodiment, the end of the inner wall of the sleeve section is provided with a first positioning member, the outer side wall of the base body is provided with a second positioning member corresponding to the first positioning member, the massage body is connected with the first positioning member and the second positioning member to relatively fix the massage body and the base body.

In one embodiment, the outer surface of the base body is provided with guide grooves, the inner wall of the sleeve section is provided with a guide key corresponding to the guide groove; or the outer surface of the base body is provided with the guide key, and the inner wall of the sleeve section is provided with the guide groove corresponding to the guide key.

In one embodiment, the driving mechanism comprises a rotating motor assembled in the base body, an eccentric component drivingly connected to the rotating motor and the output shaft that is impacted by the eccentric component to perform reciprocating motion and has an end extending outside the base body, the eccentric component comprises a bracket erected above the rotating motor, a rocker with two ends pivotally connected to one end of the bracket and an end extending out of the output shaft; an eccentric table that is drivingly connected to the output end of the rotating motor, and a movable connecting rod with one end correspondingly inserted into the eccentric table and a pivot hole formed at the opposite end; the side of the rocker close to the movable connecting rod is provided with a sliding rod corresponding to the pivot hole.

In one embodiment, the bottom of the base body is also provided with a base that is docked with the end of the sleeve section, one side of the base body is provided with a hook hole, and the base is provided with an elastic barb hooked corresponding to the hook hole, the base is fixed to the end of the base body with the elastic barb hooked in the hook hole.

After adopting the above technical solutions, the massager provided by the present disclosure has beneficial effects as follows:

In the embodiment of the present invention, the massage body is configured as the sleeve section, the pressing section and the vibration section that are connected to each other. The sleeve section is sleeved on the outside of the base body to relatively fix the massage body and the base body; the pressing section is connected to the one end of the sleeve section and is drivingly connected to the driving mechanism, and a slap band is formed in the middle part, which is used to perform point-pressure massage on the external massaged area driven by the driving mechanism; the vibration section is used to absorb the power transmitted from the pressing section to massage the external massaged area. On the one hand, it can reduce the vibration feeling transmitted to one end of the base body and cause discomfort to the user when holding it; on the other hand, the vibration section can provide vibration massage that is different from the pressing section, enriching the layers of massage and improving the user experience. Moreover, the integrated design of the massage body ensures structural strength. And before and after using the massager, the user can quickly disassemble and install the massage body by unplugging and plugging in the massage body, so as to facilitate individual deep cleaning of the massage body. At the same time, it also facilitates the replacement of the massage body.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Figure 1:
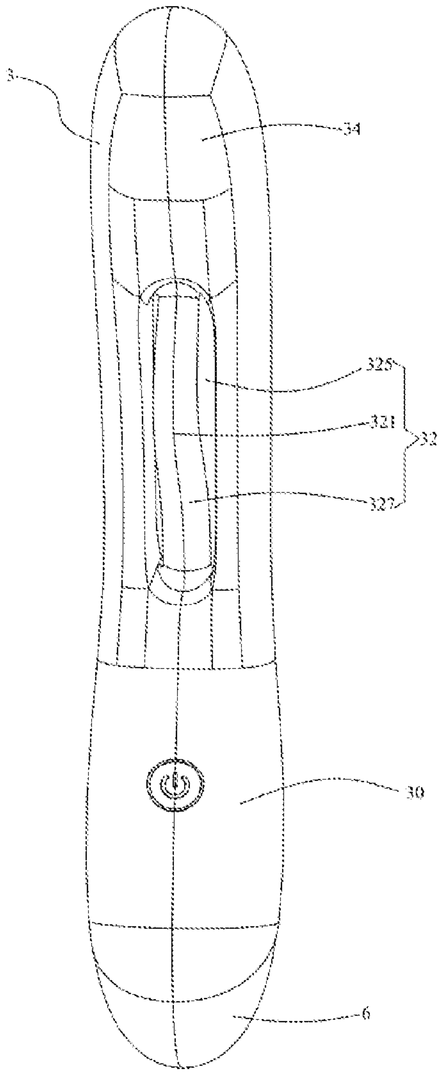
FIG. 1 is a schematic diagram of the overall structure of one embodiment of a massager provided by the present disclosure.

Reference number in the drawings:

| | | | |
|---|---|---|---|
| base body | 1 | driving mechanism | 2 |
| massage body | 3 | guide groove | 4 |
| guide key | 5 | base | 6 |
| elastic barb | 61 | circuit board | 7 |
| second positioning member | 10 | hook hole | 12 |
| output shaft | 21 | rotating motor | 23 |
| eccentric component | 25 | rocker | 250 |
| rocker | 252 | eccentric table | 254 |
| movable connecting rod | 256 | sliding rod | 258 |
| pivot hole | 2561 | sleeve section | 30 |
| first positioning member | 301 | chamfered elliptical opening | 303 |
| pressing section | 32 | striking protrusion | 321 |
| accommodation cavity | 323 | hollow hole | 325 |
| slap band | 327 | vibration section | 34 |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

Referring to FIG. 1 to FIG. 6, the present disclosure provides a massager, comprising: a base body 1, a driving mechanism 2 assembled in the base body 1, and a massage body 3 drivingly connected to the driving mechanism 2, the massage body 3 comprises: a sleeve section 30 is sleeved on the outside of the base body 1 to relatively fix the massage body 3 and the base body 1; a pressing section 32 is connected to the end of the sleeve section 30 and is drivingly connected to the driving mechanism 2, and a slap band 327 is formed in the middle part, which is used to perform point-pressure massage on the external massaged area driven by the driving mechanism 2; the vibration section 34 is relatively fixed to the end of the pressing section 32, and is used to absorb the power transmitted from the pressing section 32 to massage the external massaged area.

In the embodiment of the present invention, the massage body 3 is configured as the sleeve section 30, the pressing section 32 and the vibration section 34 that are connected to each other. The sleeve section 30 is sleeved on the outside of the base body 1 to relatively fix the massage body 3 and the base body 1; the pressing section 32 is connected to the one end of the sleeve section 30 and is drivingly connected to the driving mechanism 2, and the slap band 327 is formed in the middle part, which is used to perform point-pressure massage on the external massaged area driven by the driving mechanism 2; the vibration section 34 is used to absorb the power transmitted from the pressing section 32 to massage the external massaged area. On the one hand, it can reduce the vibration feeling transmitted to one end of the base body 1 and cause discomfort to the user when holding it; on the other hand, the vibration section 34 can provide vibration massage that is different from the pressing section 32, enriching the layers of massage and improving the user experience. Moreover, the integrated design of the massage body ensures structural strength. And before and after using the massager, the user can quickly disassemble and install the massage body 3 by unplugging and plugging in the massage body 3, so as to facilitate individual deep cleaning of the massage body 3. At the same time, it also facilitates the replacement of the massage body 3. In the specific implementation process, while the structures of the base body 1 and the driving mechanism 2 remain unchanged, the structural shape of the slap band 327 can also be changed or the control circuit board 7 is installed. The operating state of the driving mechanism 2 is controlled by the control circuit board 7 to adjust the pressing and vibration effect of the massage body 3 to achieve different massage effects and meet diverse product functional requirements. In addition, the accessories of the massage body 3 facilitate independent production and sales, which is conducive to increasing the user coverage of this massager.

Figure 4:
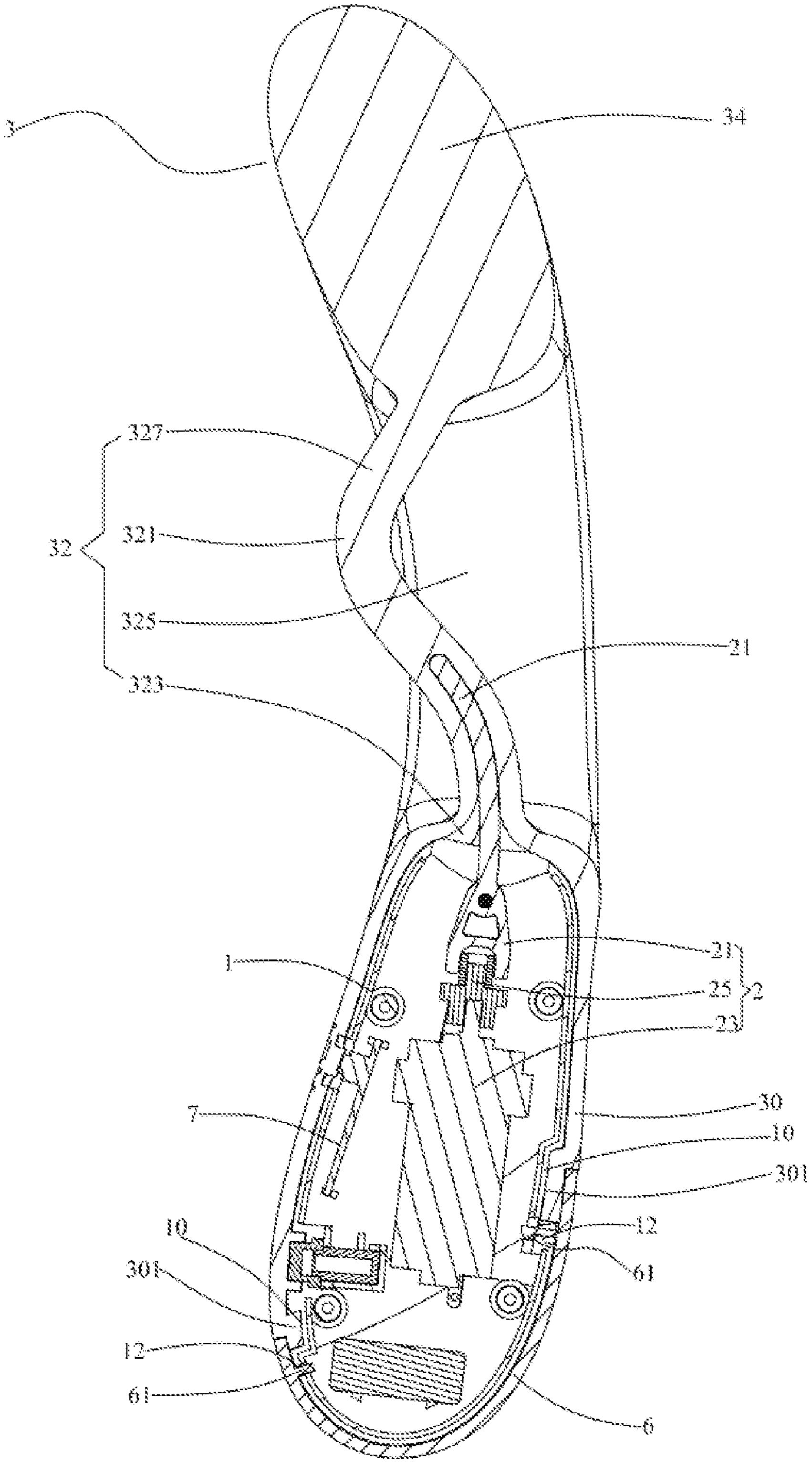
FIG. 4 is a schematic cross-sectional view of the central axis of the output shaft of one embodiment of the massager provided by the present disclosure.

In one embodiment, referring to FIG. 1 and FIG. 4, the middle part of the pressing section 32 is provided with a hollow hole 325, the slap band 327 is provided in the hollow hole 325, and its two ends are respectively fixed on the hole walls of the hollow hole 325 to connect the sleeve section 30 and the vibration section 34 respectively. In this embodiment, the hollow hole 325 is provided in the middle of the pressing section 32 and the slap band 327 is fixed in the hollow hole 325. The avoidance effect of the hollow hole 325 allows the slap band 327 to move freely within the hollow hole 325. Therefore, the pressing and beating effect of the slap band 327 on the massaged area is more intense, thereby improving the massage stimulation effect.

In one embodiment, referring to FIG. 1 and FIG. 4, the slap band 327 is provided with an accommodation cavity 323 near one end of the sleeve section 30; the driving mechanism 2 is drivingly connected with the slap band 327 by inserting the output shaft 21 into the accommodating cavity 323, and the middle part of the slap band 327 is designed to be bent to form a striking protrusion 321. In this embodiment, the accommodating cavity 323 is opened at one end of the slap band 327 to correspondingly insert and accommodate the output shaft 21 of the driving mechanism 2 to achieve effective transmission, and the slap band 327 corresponds to the striking protrusion 321 to achieve a point-pressure massage effect.

In one embodiment, referring to FIG. 4, the slap band 327 is provided with at least two striking protrusions 321, the striking protrusions 321 are smoothly transitioned into arcs.

In this embodiment, by setting the striking protrusions 321 as circular arcs and smooth transitions, the power transmitted from the output shaft 21 can be dispersed more gently, and the pressing and striking force can be gentler. Moreover, the smooth transition zone of the arc delays the power transmission to a certain extent, and the slap band 327 forms a wave-shaped tapping array on the massaged area, generating sensory stimulation like waves and trembling, thereby enhancing the user experience of the product.

Figure 3:
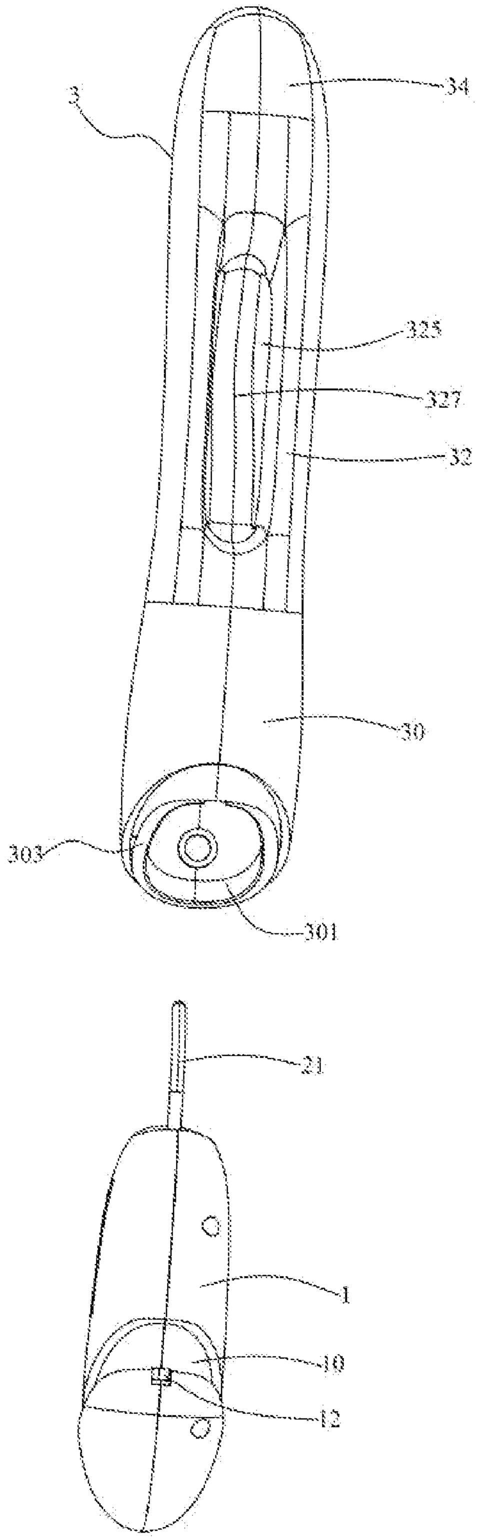
FIG. 3 is a schematic diagram of the disassembled structure of one embodiment of the massager provided by the present disclosure from another perspective view.

In one embodiment, referring to FIG. 3, the end opening of the sleeve section 30 is a chamfered elliptical opening 303 surrounding the outer wall of the base body 1. In this embodiment, the end opening of the sleeve section 30 is the chamfered elliptical opening 303 that surrounds the outer wall of the base body 1, which can not only ensure the stability of the connection, but also facilitate the subsequent operation of removing and inserting the massage body 3.

Figure 2:
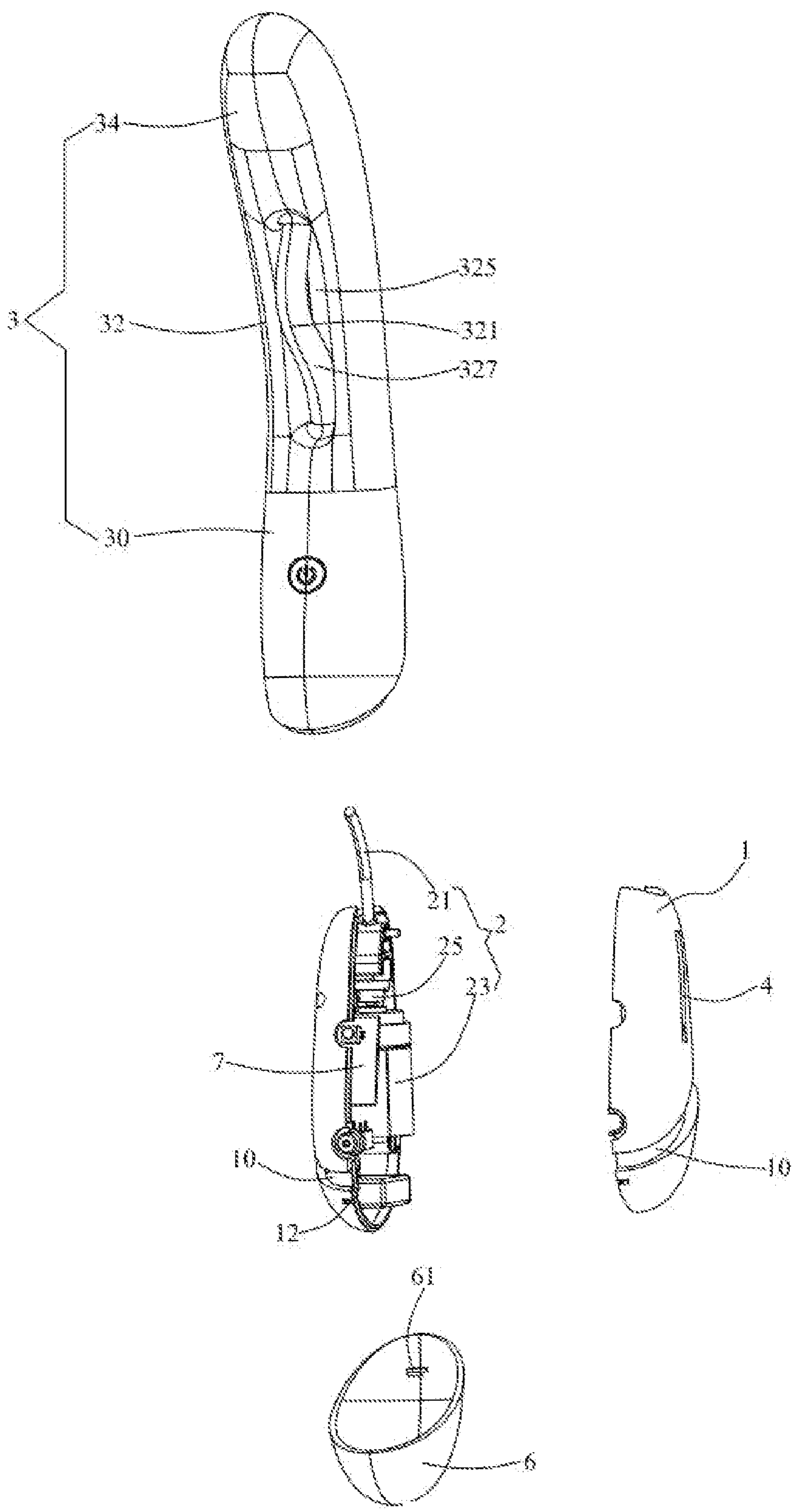
FIG. 2 is a schematic diagram of the disassembled structure of one embodiment of the massager provided by the present disclosure.

In one embodiment, referring to FIG. 2 to FIG. 4, the sleeve section 30, the pressing section 32 and the vibration section 34 are integrally formed. In this embodiment, the sleeve section 30, the pressing section 32 and the vibration section 34 of the massage body 3 are manufactured through an integrated molding process. The massage body 3 has good structural stability and can withstand the insertion and removal operations. In the specific implementation process, the massage body 3 can be made of relatively soft silicone and other materials, which has mature molding technology and good usability.

In one embodiment, referring to FIG. 2 to FIG. 4, the end of the inner wall of the sleeve section 30 is provided with a first positioning member 301, the outer side wall of the base body 1 is provided with a second positioning member 10 corresponding to the first positioning member 301, the massage body 3 is connected with the first positioning member 301 and the second positioning member 10 to relatively fix the massage body 3 and the base body 1. In this embodiment, the massage body 3 and the base body 1 are relatively fixed through the butt-fitting of the first positioning member 301 and the second positioning member 10, which facilitates the disassembly and assembly of the massage body 3. During specific implementation, the first positioning member 301 and the second positioning member 10 may adopt structures such as buckle components, positioning rings/protrusions and positioning grooves/holes, or positioning inserts and positioning slots.

Figure 5:
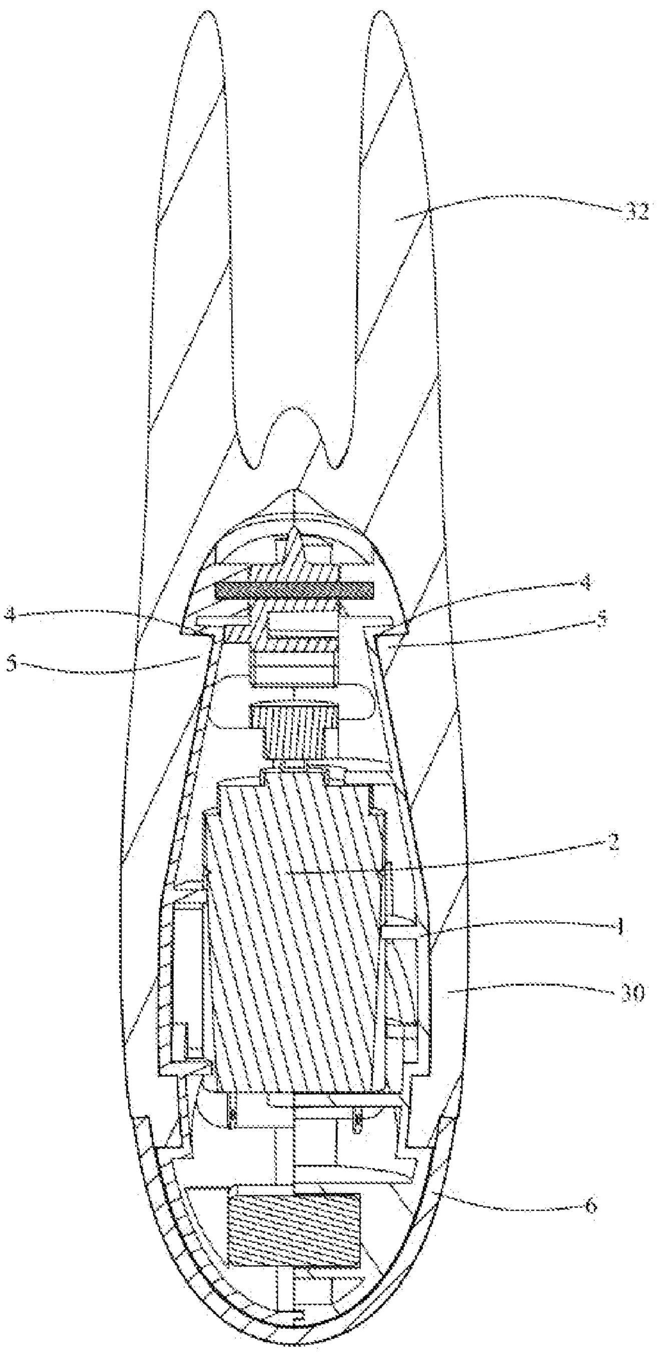
FIG. 5 is a schematic longitudinal cross-sectional view through the guide groove of one embodiment of the massager provided by the present disclosure.

In one embodiment, referring to FIG. 3 and FIG. 5, the outer surface of the base body 1 is provided with guide grooves 4; the inner wall of the sleeve section 30 is provided with a guide key 5 corresponding to the guide groove 4; or the outer surface of the base body 1 is provided with the guide key 5, and the inner wall of the sleeve section 30 is provided with the guide groove 4 corresponding to the guide key 5. In this embodiment, the sleeve section 30 and the base body 1 are sleeved and connected through the plug-in fit of the guide groove 4 and the guide key 5, thereby improving the assembly efficiency of the massage body 3 and the base body 1.

Figure 6:
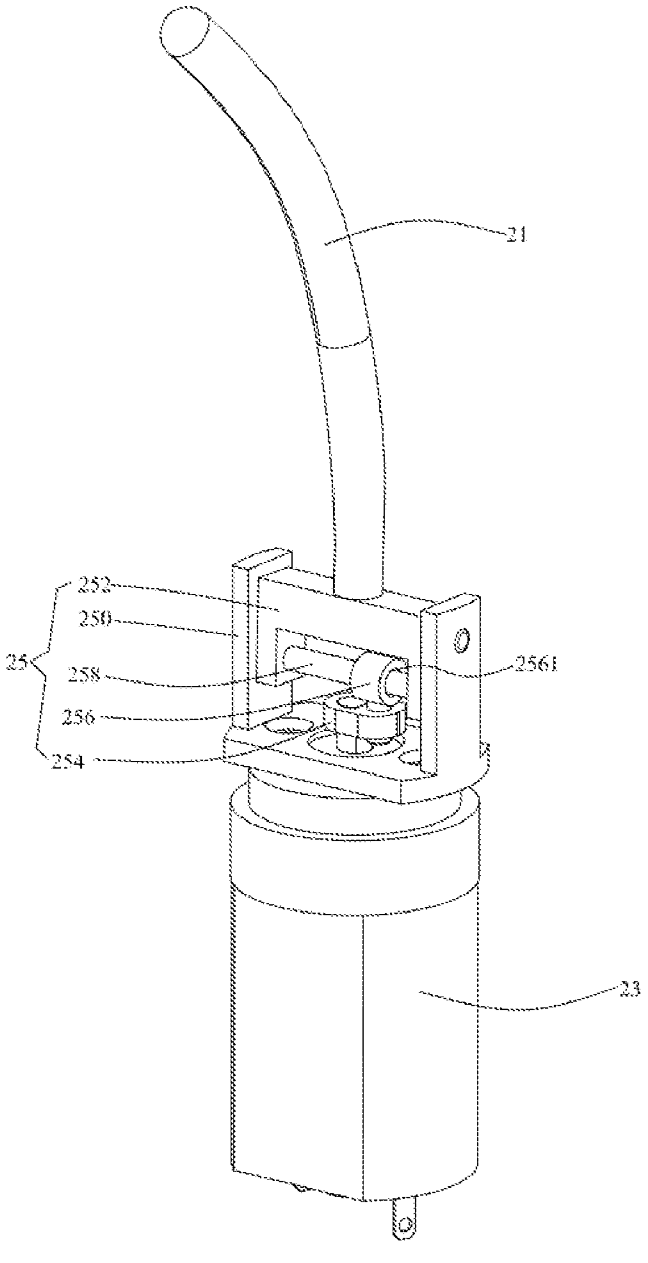
FIG. 6 is a schematic structural diagram of the driving mechanism of one embodiment of the massager provided by the present disclosure.

In one embodiment, referring to FIG. 6, the driving mechanism 2 comprises a rotating motor 23 assembled in the base body 1, an eccentric component 25 drivingly connected to the rotating motor 23 and the output shaft 21 that is impacted by the eccentric component 25 to perform reciprocating motion and has an end extending outside the base body 1, the eccentric component 25 comprises a bracket 250 erected above the rotating motor 23, a rocker 252 with two ends pivotally connected to one end of the bracket 250 and an end extending out of the output shaft 21; an eccentric table 254 that is drivingly connected to the output end of the rotating motor 23, and a movable connecting rod 256 with one end correspondingly inserted into the eccentric table 254 and a pivot hole 2561 formed at the opposite end; the side of the rocker 252 close to the movable connecting rod 256 is provided with a sliding rod 258 corresponding to the pivot hole 2561. Drive the eccentric table 254 to rotate by rotating the motor 23, thereby driving the movable connecting rod 256 to deviate from the output end of the rotating motor 23 and rotate synchronously. Then the sliding rod 258 slides relatively in the pivot hole 2561 of the movable connecting rod 256 and drives the rocker 252 to reciprocate, and then the output shaft 21 also reciprocates synchronously. Compared with the traditional eccentric structure, it can reduce the wear between components that collide with each other and ensure the accuracy of the swing angle of the output shaft 21.

In one embodiment, referring to FIG. 1 to FIG. 4, the bottom of the base body 1 is also provided with a base 6 that is docked with the end of the sleeve section 30, one side of the base body 1 is provided with a hook hole 12, and the base 6 is provided with an elastic barb 61 hooked corresponding to the hook hole 12, the base 6 is fixed to the end of the base body 1 with the elastic barb 61 hooked in the hook hole 12. In this embodiment, the hook hole 12 is provided on one side of the base body 1, and the base 6 is provided with the elastic barb 61 hooked into the hook hole 12 and fixed to the end of the collective, so as to realize a butt connection with the end of the sleeve section 30 and improve the smoothness and beauty of the appearance of the massager.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. A massager, comprising: a base body, a driving mechanism assembled in the base body, and a massage body drivingly connected to the driving mechanism, characterized in that the massage body comprises:

a sleeve section is sleeved on the outside of the base body to relatively fix the massage body and the base body;

a pressing section is connected to the end of the sleeve section and is drivingly connected to the driving mechanism, and a slap band is formed in a middle part, which is used to perform massage on the external massaged area driven by the driving mechanism;

a vibration section is relatively fixed to the end of the pressing section, and is used to absorb the power transmitted from the pressing section to massage the external massaged area;

wherein the middle part of the pressing section is provided with a hollow hole, the slap band is provided in the hollow hole, and its two ends are respectively fixed on the hole walls of the hollow hole to connect the sleeve section and the vibration section respectively;

wherein the slap band is provided with an accommodation cavity near one end of the sleeve section; the driving mechanism is drivingly connected with the slap band by inserting an output shaft into the accommodating cavity, and the middle part of the slap band is designed to be bent to form a striking protrusion.

2. The massager of claim 1, wherein the slap band is provided with at least two striking protrusions, the striking protrusions are smoothly transitioned into arcs.

3. The massager of claim 1, wherein an end opening of the sleeve section is a chamfered elliptical opening surrounding the outer wall of the base body.

4. The massager of claim 1, wherein the sleeve section, the pressing section and the vibration section are integrally formed.

5. The massager of claim 1, wherein an end of an inner wall of the sleeve section is provided with a first positioning member, the outer side wall of the base body is provided with a second positioning member corresponding to the first positioning member, the massage body is connected with the first positioning member and the second positioning member to relatively fix the massage body and the base body.

6. The massager of claim 1, wherein an outer surface of the base body is provided with guide grooves; an inner wall of the sleeve section is provided with a guide key corresponding to the guide groove; or the outer surface of the base body is provided with the guide key, and the inner wall of the sleeve section is provided with the guide groove corresponding to the guide key.

7. The massager of claim 1, wherein the driving mechanism comprises a rotating motor assembled in the base body, an eccentric component drivingly connected to the rotating motor and the output shaft that is impacted by the eccentric component to perform reciprocating motion and has an end extending outside the base body, the eccentric component comprises a bracket erected above the rotating motor, a rocker with two ends pivotally connected to one end of the bracket and an end extending out of the output shaft; an eccentric table that is drivingly connected to the output end of the rotating motor, and a movable connecting rod with one end correspondingly inserted into the eccentric table and a pivot hole formed at the opposite end; the side of the rocker close to the movable connecting rod is provided with a sliding rod corresponding to the pivot hole.

8. The massager of claim 1, wherein the bottom of the base body is also provided with a base that is docked with the end of the sleeve section, one side of the base body is provided with a hook hole, and the base is provided with an elastic barb hooked corresponding to the hook hole, the base is fixed to the end of the base body with the elastic barb hooked in the hook hole.

9. A massager, comprising: a base body, a driving mechanism assembled in the base body, and a massage body drivingly connected to the driving mechanism, characterized in that the massage body comprises:

a sleeve section is sleeved on the outside of the base body to relatively fix the massage body and the base body;

a pressing section is connected to the end of the sleeve section and is drivingly connected to the driving mechanism, and a slap band is formed in a middle part, which is used to perform massage on the external massaged area driven by the driving mechanism;

a vibration section is relatively fixed to the end of the pressing section, and is used to absorb the power transmitted from the pressing section to massage the external massaged area;

wherein the driving mechanism comprises a rotating motor assembled in the base body, an eccentric component drivingly connected to the rotating motor and an output shaft that is impacted by the eccentric component to perform reciprocating motion and has an end extending outside the base body, the eccentric component comprises a bracket erected above the rotating motor, a rocker with two ends pivotally connected to one end of the bracket and an end extending out of the output shaft; an eccentric table that is drivingly connected to the output end of the rotating motor, and a movable connecting rod with one end correspondingly inserted into the eccentric table and a pivot hole formed at the opposite end; the side of the rocker close to the movable connecting rod is provided with a sliding rod corresponding to the pivot hole.

* * * * *